(12) United States Patent
Attaluri et al.

(10) Patent No.: US 6,484,181 B2
(45) Date of Patent: Nov. 19, 2002

(54) METHOD AND SYSTEM FOR HANDLING FOREIGN KEY UPDATE IN AN OBJECT-ORIENTED DATABASE ENVIRONMENT

(75) Inventors: Gopi Krishna Attaluri, Sunnyvale, CA (US); David Joseph Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/043,076

(22) Filed: Jan. 9, 2002

(65) Prior Publication Data

US 2002/0099688 A1 Jul. 25, 2002

Related U.S. Application Data

(62) Division of application No. 09/364,671, filed on Jul. 30, 1999, now Pat. No. 6,339,777.

(51) Int. Cl.[7] .............................................. G06F 17/30
(52) U.S. Cl. ...................... 707/103; 707/203; 707/104
(58) Field of Search .............................. 707/103, 203, 707/104, 1, 100, 101

(56) References Cited

U.S. PATENT DOCUMENTS

| | | |
|---|---|---|
| 4,918,593 A | 4/1990 | Huber |
| 4,933,848 A | 6/1990 | Haderle et al. ............. 707/201 |
| 5,133,068 A | 7/1992 | Crus et al. .................. 707/100 |
| 5,226,158 A | 7/1993 | Horn et al. ................. 707/201 |
| 5,386,557 A | 1/1995 | Boykin et al. ................. 707/1 |
| 5,553,218 A | 9/1996 | Li et al. |
| 5,706,494 A | 1/1998 | Cochrane et al. .............. 707/2 |
| 5,873,075 A | 2/1999 | Cochrane et al. .............. 707/2 |
| 5,890,154 A | 3/1999 | Hsiao et al. |
| 6,014,656 A * | 1/2000 | Hallmark et al. .............. 707/2 |
| 6,266,662 B1 * | 7/2001 | Ozbutun et al. ............. 707/10 |
| 6,385,618 B1 * | 5/2002 | Ng et al. ................ 707/103 R |

* cited by examiner

*Primary Examiner*—Sanjiv Shah
(74) *Attorney, Agent, or Firm*—Sawyer Law Group LLP

(57) ABSTRACT

A method and system for handling foreign key database updates. The database includes one or more tables where each table includes at least one row and a primary key or foreign key. The method and system include evaluating a list of row operations for foreign key relationships. After evaluating the foreign key relationships, the tables determined to have acyclic foreign key relationships are grouped into a first set of tables and the tables determined to have cyclic foreign key relationships are grouped into a second set of tables. The method and system further include ordering the first set of tables into a list based on the foreign key relationships among the set of tables, such that a parent table will be processed before a child table. The row operations are then applied to each table in the list in the specified order.

3 Claims, 8 Drawing Sheets

METHOD AND SYSTEM FOR HANDLING FOREIGN KEY UPDATE IN AN OBJECT-ORIENTED DATABASE ENVIRONMENT

CROSS-REFERENCE TO RELATED APPLICATIONS

The present application is a divisional of U.S. Ser. No. 09/364,671, U.S. Pat. No. 6,339,777 filed Jul. 30, 1999, and assigned of record to International Business Machines Corporation, of Armonk, N.Y.

FIELD OF THE INVENTION

The present invention relates to database environments, and more particularly to method and system for handling foreign key database updates in such environments.

BACKGROUND OF THE INVENTION

Today's object-oriented database environments are typically used as front-ends to more simplistic but efficient data models, such as flat files and relational databases. In such an environment, a client submits a semantic-rich query at the object-level and the system generates an execution plan specifying what queries to run against the relational databases, and how to combine those results to compute the final result.

In a relational database, data is perceived by its users as a collection of tables. The tables in a relational database include a row of column names specifying one or more attribute fields, and zero or more data rows containing one scalar value for each of the column fields. Objects referred to in the query received from the client are identified by a primary key. And the row in the underlying relational database table corresponding to this object is also uniquely identified by this primary key. A foreign key is an attribute(s) in a table that forms a relationship with another table by storing the primary key value of the related table.

Given a set of database tables, foreign key relationships are not necessarily present. If foreign key relationships are present in the set of tables, then the foreign key relationships are classified as either acyclic or cyclic.

FIG. 1 is a diagram illustrating acyclic foreign key relationships between example database tables. In the example, three tables are shown: Department, Project, and Employee. Each table includes one or more rows, although only one row is shown, and each row includes a primary key (designated with a * symbol) that uniquely identifies that row. In the Department table, the attribute "depno" is the primary key. In the Project table, the attribute "projno" is the primary key. And in the Employee table, the attribute "empno" is the primary key.

As shown by the arrows, a foreign key relationship exists between the Employee table and the Department table and between the Employee table and the Project table, because the Employee table includes the primary key "depno" from the Department table and the primary key "projno" from the Project table. The Department and Project tables are referred to as parent tables since they are the source of the primary keys in the Employee table. The Employee table is referred to as the child because it contains the foreign keys. The Employee table is dependent because its foreign key values are constrained to be values of the primary keys in the parent tables.

FIG. 2 is a diagram illustrating cyclic foreign key relationships between example tables. In the example, three tables are shown: Department, Employee, and Network. As before, the primary key of the Department table is "depno" and the primary key of the Employee table is "empno". The Network table's primary, key is "netno".

A cycle of foreign key relationships exists between the tables because there is a closed loop of child/parent relationships between the tables. As shown, the Department table is a child of the Network table since it includes the Network table's primary key "netno", the Network table is a child of the Employee table since it includes the Employee table's primary key "empno", and the Employee table is a child of the Department table since it includes the Department table's primary key "depno". In contrast, the acyclic example in FIG. 1 does not include a closed loop of child/parent relationships between the tables.

During operation of the database, an application may perform a number of object creation, removal and modification operations. The operations are typically implemented through commands such as Insert row, Delete row, and Update row, respectively. The application may pass one or more such row operations to the database and require that the changes be applied to the database at transaction commit time.

At commit time, the operations may alter one or more parent-child relationships between two objects by creating a new child for a parent, moving a child from one parent to another, removing a child's parent, or removing a child. When the parent-child relationship changes, the foreign key values need to be updated accordingly. However, the relational database imposes referential integrity (RI) constraints on foreign key updates. For example, a parent row's delete must be preceded by all children rows' deletes, and any child row can be inserted only after the parent has been inserted. Stated more formally, the RI constraints are:

a) a parent with a primary key must be inserted into the database or already exist before that foreign key may be assigned to a child row, and b) a child row having a foreign key must be deleted before the parent with the primary key can be deleted.

When the list of row operations to be performed is received by the database, the insert, update and delete of the rows must be ordered to satisfy these RI constraints.

Conventional methods for ordering the row operations take all the rows to be modified and order them in a list to satisfy the constraints. This entails sequentially traversing the row operations and for each row finding rows that have corresponding children and/or parents. The child/parent rows are then examined to determine whether the child/parent needs to be modified before the current row. If it does, the child/parent row is placed in the list before the current row. If the child/parent row needs to be modified after the current row, then it is placed in the list after the current row. The result of this process is a linked list whose order defines the order of the updates in a way that satisfies all RI constraints. Although this method effectively accomplishes the task of ordering the row operations, the method is computationally expensive if there are many rows to be modified.

Another issue with database row operations is the case where foreign and primary keys overlap. A foreign or primary key can contain multiple attributes, and two keys overlap when they have one or more attributes in common. A foreign key may partially or completely overlap with other foreign or primary keys.

Consider, for example, a child table T1 with a foreign key (A1, A2, A3), where A1, A2 and A3 are the attributes in the foreign key. When a user updates the foreign key for a given row in table T1, the value of some or all the attributes in the foreign key may change. Key overlap poses certain challenges when foreign keys are modified.

In case where a foreign key overlaps a primary key, the update of the foreign key may or may not be allowed. When an update is allowed, it invalidates any other foreign key the current key partially but not completely overlaps with. The task is to define which foreign key updates should be allowed and which ones should be forbidden.

To handle a row updates efficiently, the system must determine for each attribute in a row to be updated, the keys (foreign or primary) the attribute overlaps with, the keys the attribute completely contains, and the keys the attribute is completely contained by. This information determines whether to allow the foreign key update or not (it will not be allowed if it changes a primary key attribute value). It also determines what other foreign keys are invalidated by this update.

In conventional systems, this information is maintained in linked lists. Unfortunately, however, creating and scanning large linked lists is memory intensive and can be slow.

Accordingly, what is needed is a method and system for more efficiently ordering the database row operations to satisfy the RI constraints, and for detecting and handling other foreign and primary key updates when an overlapping foreign key is updated. The present invention addresses such needs.

SUMMARY OF THE INVENTION

The present invention is a method and system for handling foreign key database updates. The database includes one or more tables where each table includes at least one row and a primary key or foreign key. The method and system include evaluating a list of row operations for foreign key relationships. After evaluating the foreign key relationships, the tables determined to have acyclic foreign key relationships are grouped into a first set of tables and the tables determined to have cyclic foreign key relationships are grouped into a second set of tables. The method and system further include ordering the first set of tables into a list based on the foreign key relationships among the tables, such that a parent table will be processed before a child table. The row operations are then applied to each table in the list in the specified order. In a second aspect of the present invention, overlapping foreign and primary keys are represented as a bit map to increase processing speed.

According to the method and system of the present invention, the order that the row operations are applied is based on table ordering, rather than row ordering, which speeds processing since in almost every case, there are often less tables to order than rows. In addition, tables having acylic foreign key relationships are processed separately from tables having cyclic foreign key relationships. The method and system use an optimized algorithm for handling foreign key updates for acylic tables, taking advantage of the fact that acyclic relationships occur much more frequently than cyclic one, thereby increasing overall speed of the system.

DETAILED DESCRIPTION

The present invention relates to the handling of: foreign key database updates. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
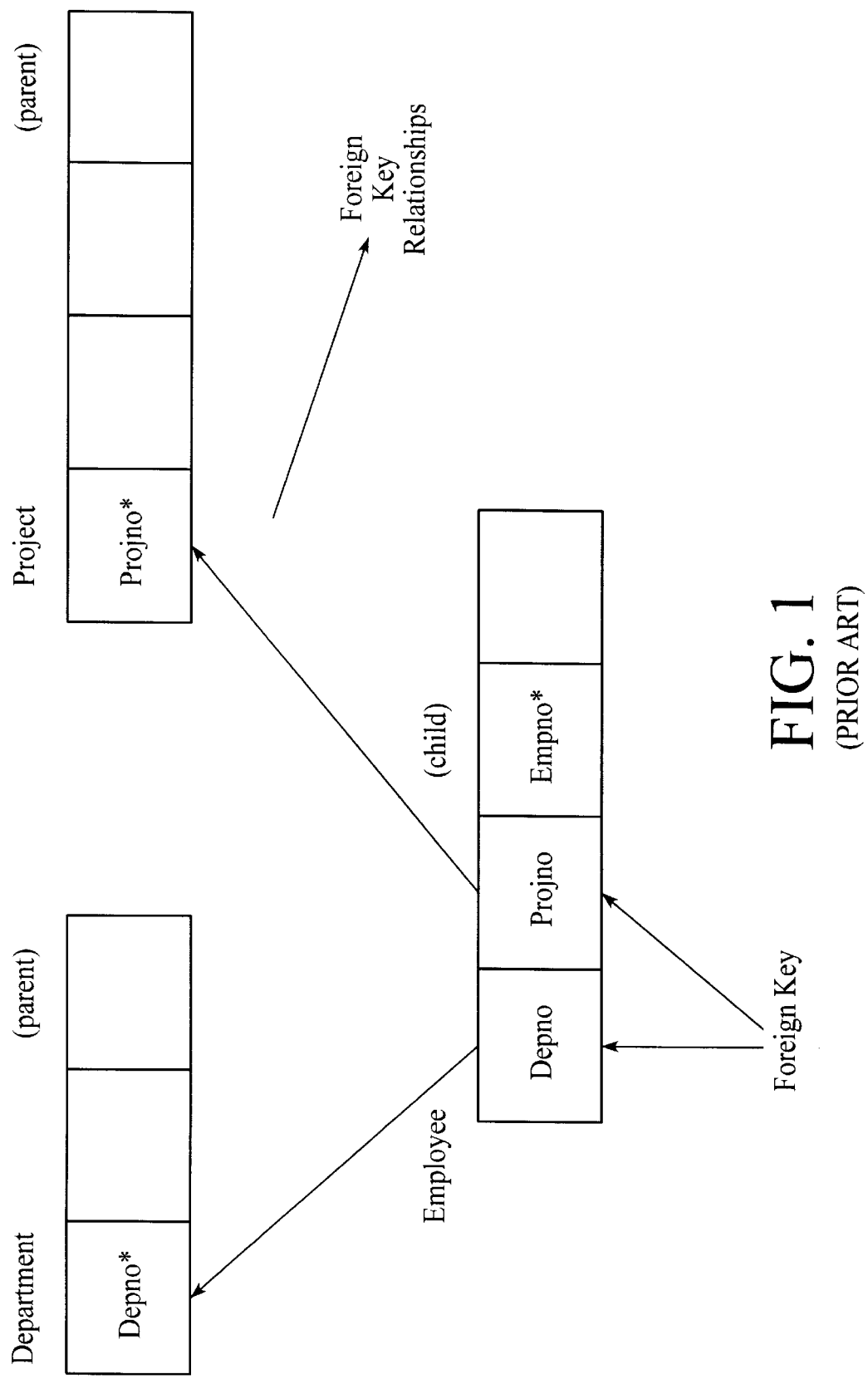
FIG. 1 is a diagram illustrating foreign key relationships between example database tables.
Figure 2:
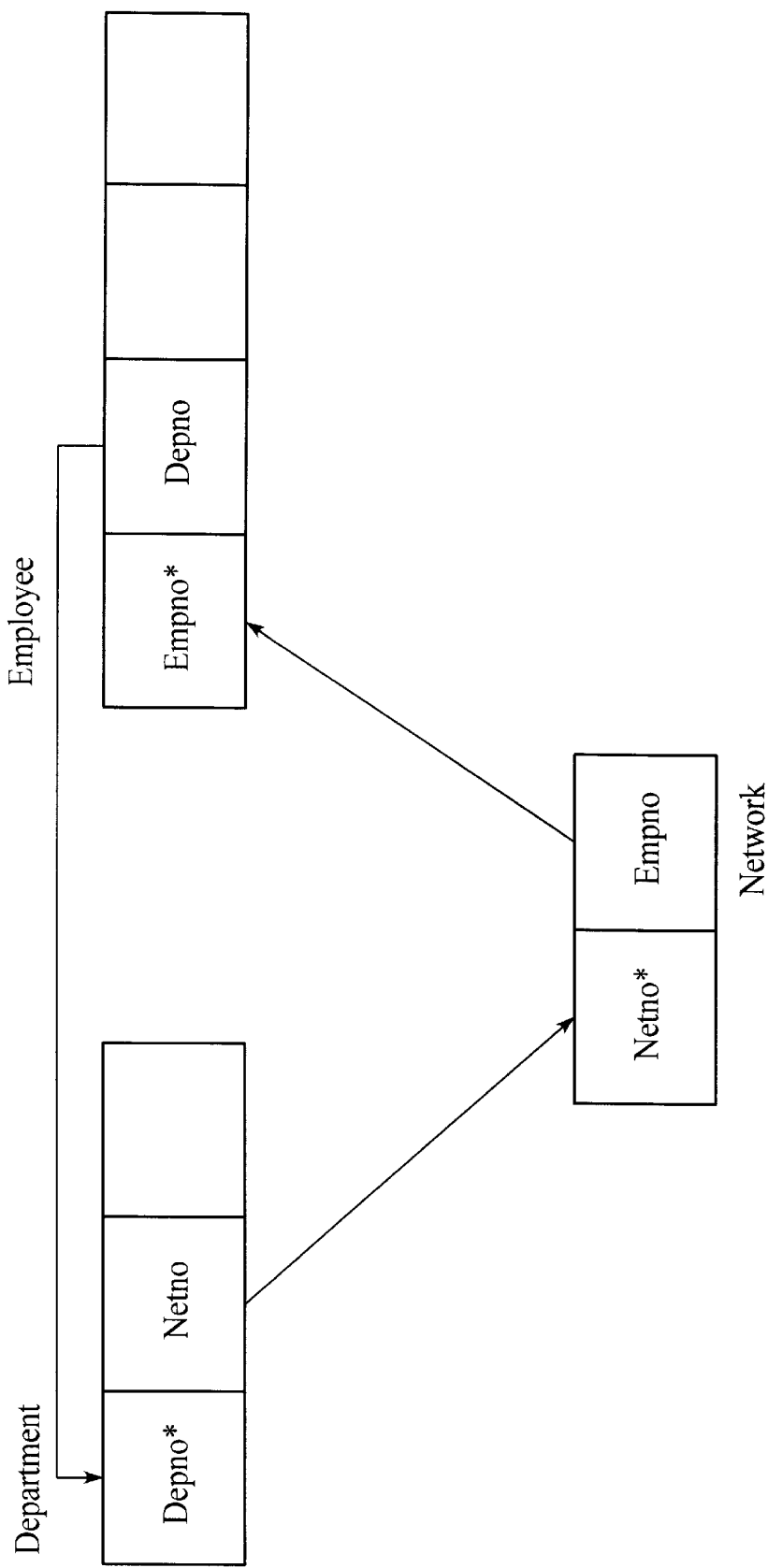
FIG. 2 is a diagram illustrating cyclic foreign key relationships between example tables.
Figure 3:
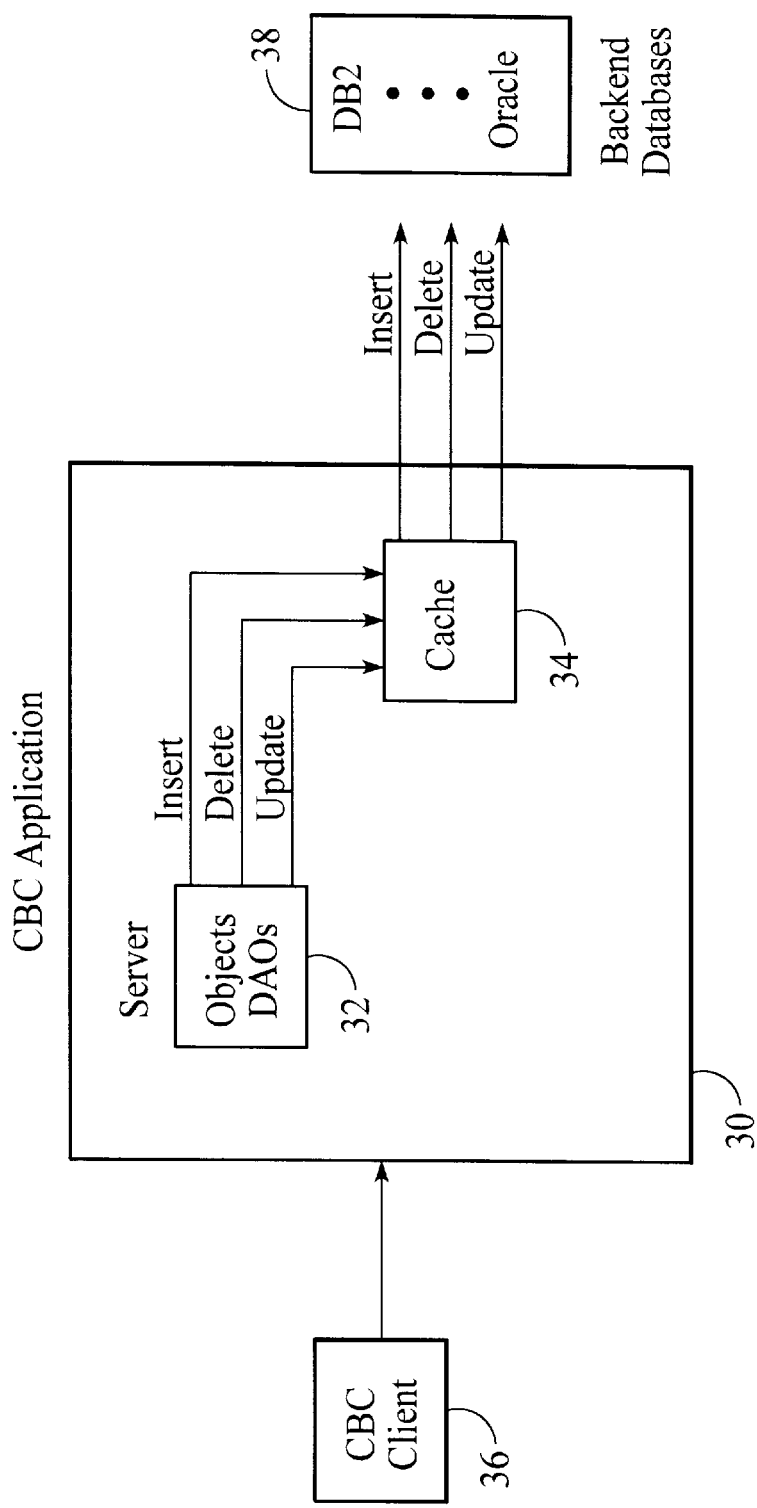
FIG. 3 is a block diagram illustrating the operating environment of the present invention.

FIG. 3 is a block diagram illustrating the operating environment of the present invention. A component broker connector (CBC) application 30 provides an object-oriented environment for developing and/or administrating applications for background databases 38. The CBC application 30 includes an application server 32 and a cache 34. A CBC client 36 submits semantic-rich queries regarding objects in the database 38 to the CBC application 30, where they are received by the application server 32.

The objects specified in the request exist in object space, and are referred to as data access objects (DAOs). The queries may also specify operations to be performed on the DAOs, such as insert object, delete object, and update object. The CBC client 36 typically submits these operations to the CBC application 30 in random order within a single transaction.

The application server 32 manages the details of the interaction with the client (e.g., connection and context), and is responsible for receiving these object space requests and passing them on to the cache 34.

One purpose of the cache 34 is to translate the queries and operations from object space into database space. This is done by mapping the DAOs to tables and rows and applying the insert, delete, and update operations on those rows. When an insert, delete, or update is to be performed on a DAO, the cache 34 translates it into an insert row, delete row, or update row, respectively.

At transaction commit time, the operations may alter one or more parent-child relationships between two rows. When the parent-child relationship changes, the foreign key values need to be updated accordingly. The cache 34 contains information regarding the foreign key relationships that exists between different tables in those rows, and the rules regarding referential integrity (RI) constraints that control the order in which the foreign key updates must be performed. The cache 34 orders the row operations in accordance with the present invention, such that the RI constraints are satisfied without user intervention.

One problem with foreign key updates is that enforcing the RI constraints increases in complexity when cyclic foreign key relationships are present in a transaction. Algorithms for handling updates to cyclic foreign key relationships are known, and will also handle acyclic foreign key updates. Such algorithms sequentially examine all the rows to be modified and order them in a list to satisfy the RI constraints. The result of this process is a linked list whose order defines the order of updates in a way that satisfies all RI constraints.

Although this method effectively accomplishes the task of ordering the row operations, the cost of processing is directly proportional to the number of rows to be modified in those rows. The process can be computationally expensive if there are many rows.

According to the method and system of the present invention, the order that the row operations are applied is based on table ordering, rather than row order, which speeds processing since in almost every case, there are often less tables. For example, assume a single transaction updates one-half of all the rows in a database. Assume further that the database consists of ten tables having one million rows each, yielding a total of ten million rows. Conventional methods would require sorting five million records, whereas the present invention would require sorting only ten tables.

In addition, the present invention processes tables having acylic foreign key relationships separately from tables having cyclic foreign key relationships. The method and system use an optimized algorithm for handling foreign key updates for acylic tables, taking advantage of the fact that acyclic relationships occur much more frequently than cyclic ones, thereby increasing overall speed of the system.

Figure 4:
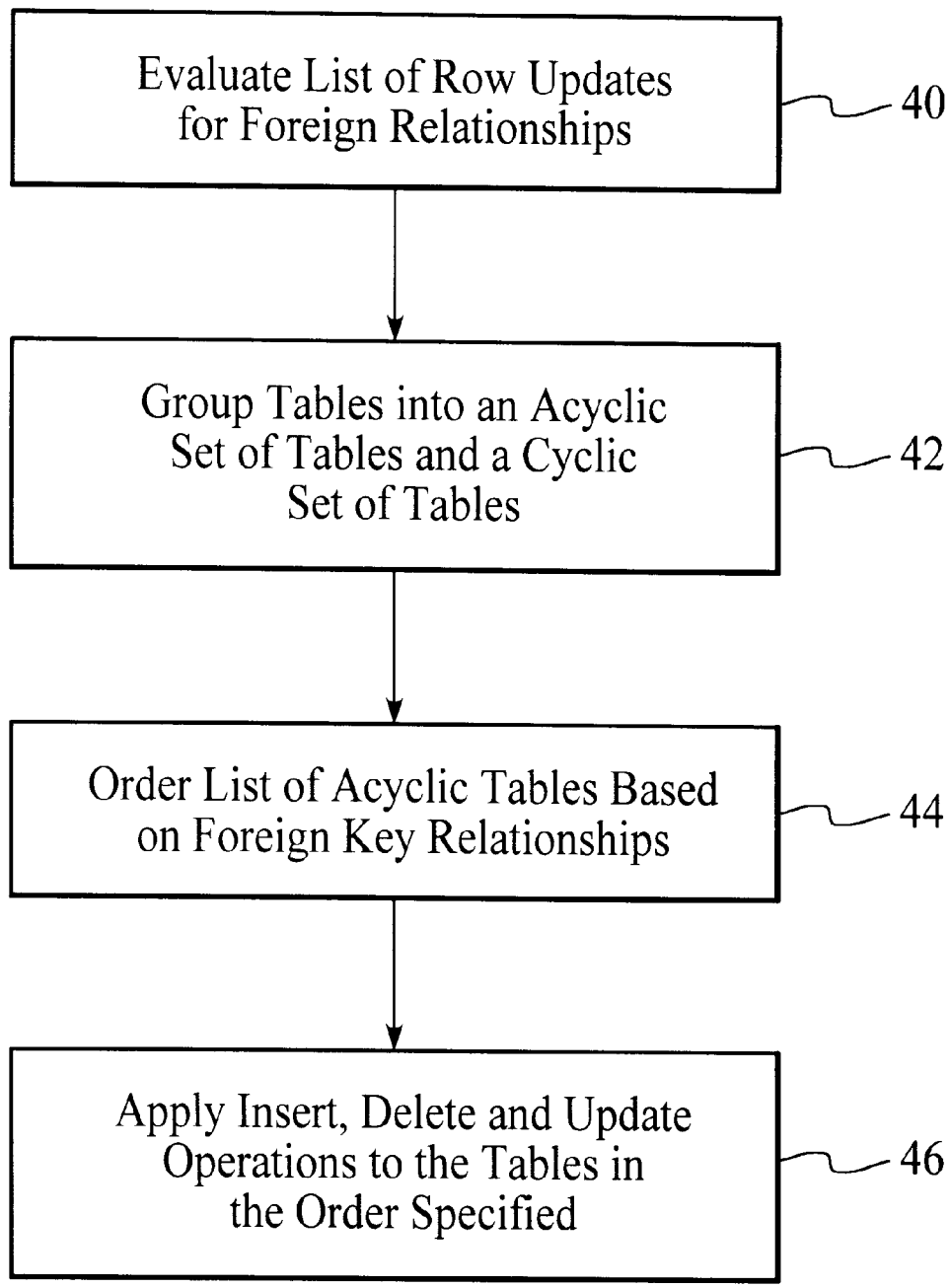
FIG. 4 is a flow chart illustrating the process of handling foreign key updates in accordance with the present invention.
Figure 5:
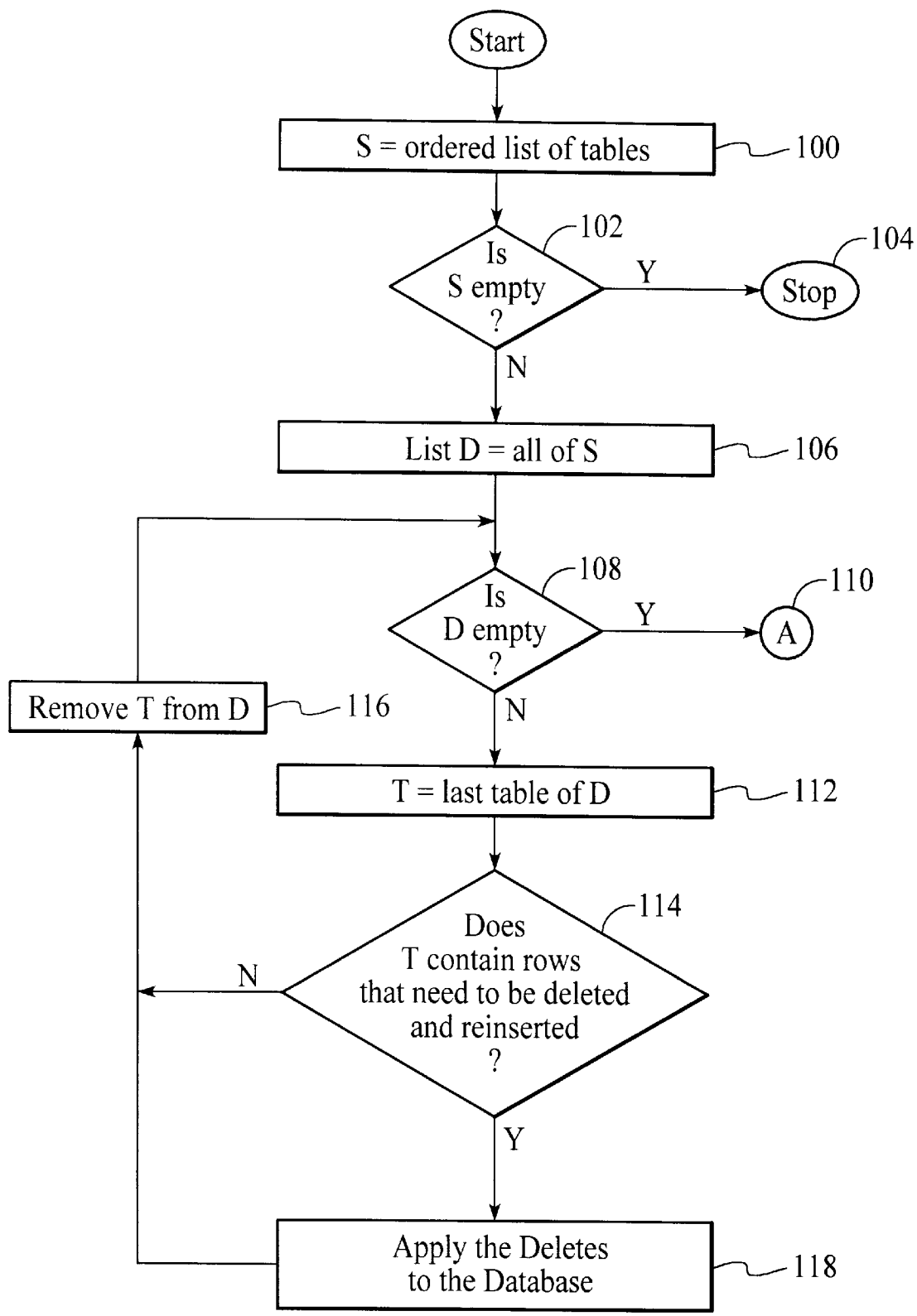
FIGS. 5–8 are flow charts illustrating the acyclic foreign key update scheme in detail.

FIG. 4 is a flow chart illustrating the process of handling foreign key updates in accordance with the present invention. Once a transaction is received, the process begins by evaluating a list of row operations for foreign key relationships in step 40. Tables determined to have acyclic foreign key relationships are then grouped into an acyclic set of tables, and tables determined to have cyclic foreign key relationships are grouped into a cyclic set of tables in step 42. A table is in the cyclic set if and only if either it is in a cycle of foreign key relationships or is related to a table that is in a cycle.

After ordering the tables, the acyclic set of tables is ordered into a list based on the foreign key relationships among the set of tables in step 44. The order ensures that a parent table will be processed before a child table. The beginning of the list is the root and the end of the list is the leaf. Tables listed higher on the list are ancestors of tables appearing further down the list. After the tables are ordered, row operations are applied to each table in the following sequence: 1) rows to be deleted and reinserted, 2) rows to be inserted, 3) rows to be updated, and 4) rows to be deleted but not reinserted.

Referring now to FIGS. 5–8, flow charts illustrating the acyclic foreign key update scheme in detail are shown. The process begins in FIG. 5 where a variable "S" is set equal to an ordered list of acyclic tables that contain rows that must be inserted, deleted, or updated in a database in step 100.

If it is determined that "S" is empty in step 102 then the process immediately/ ends in step 104. If "S" is not empty, then four copies of "S" are made, "D", "X", "U", and "E", each processed in separately as shown in the flow charts of FIGS. 5–8. The delete and reinsert row operation will be performed on "D" in FIG. 5. The insert row operation will be performed on "X" in FIG. 6. The update row operation will be performed on "U" in FIG. 7. And the delete row operation will be performed on "E" in FIG. 6.

Referring again to FIG. 5, list "D" is set equal to "S" in step 106 to begin the delete and reinsert row operation. It is then determined if "D" is empty in step 108. If "D" is not empty, then the variable "T" is set equal to the last table in "D" in step 112. It is then determined if "T" contains rows that need to be deleted and reinserted in step 114. If there are such rows in table "T", then the delete operations are applied to those rows in step 118 and is removed from the list "D" in step 116. If there are, no rows in table "T" that need to be deleted and reinserted in step 114, "T" is simply removed from the list "D" in step 116. After table "T" is removed, the process resumes with step 108.

Figure 6:
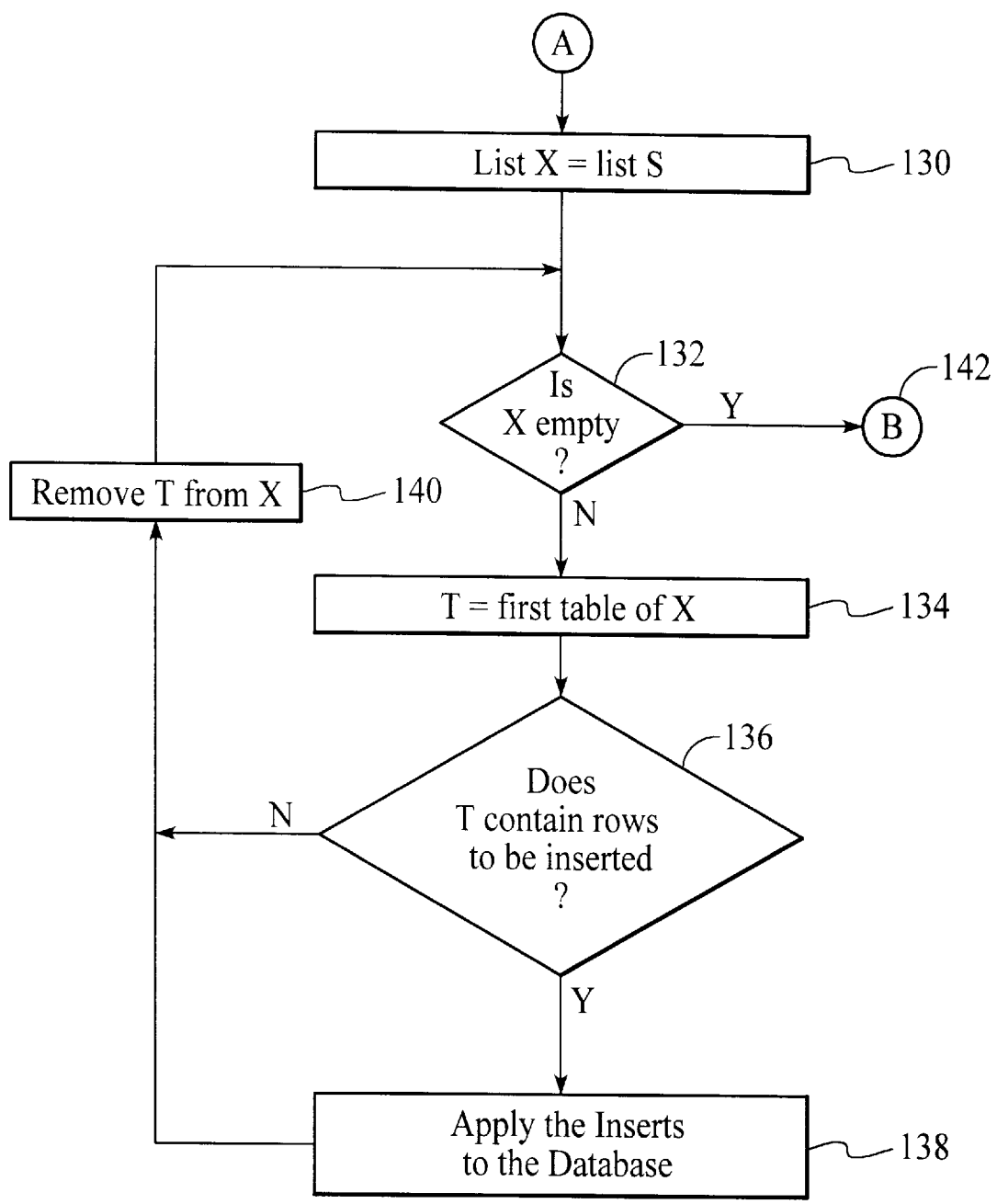

When it is determined that "D" is empty in step 108, the process continues as shown in FIG. 6, which applies the insert operation to the acyclic tables.

To begin, a list "X" is set equal to list "S" in step 130. It is then determined if "X" is empty in step 132. If not, then "T" is set equal to the first table of "X" in step 134. It is then determined if "T" contains rows that need to be inserted in step 136. If there are such rows in table "T", then the insert operations are applied to those rows in step 138 and "T" is removed from the list "X" in step 140. If there are no rows in table "T" that need to be inserted in step 136, "T" is simply removed from the list "X" in step 140. After table "T" is removed, the process resumes with step 132.

Figure 7:
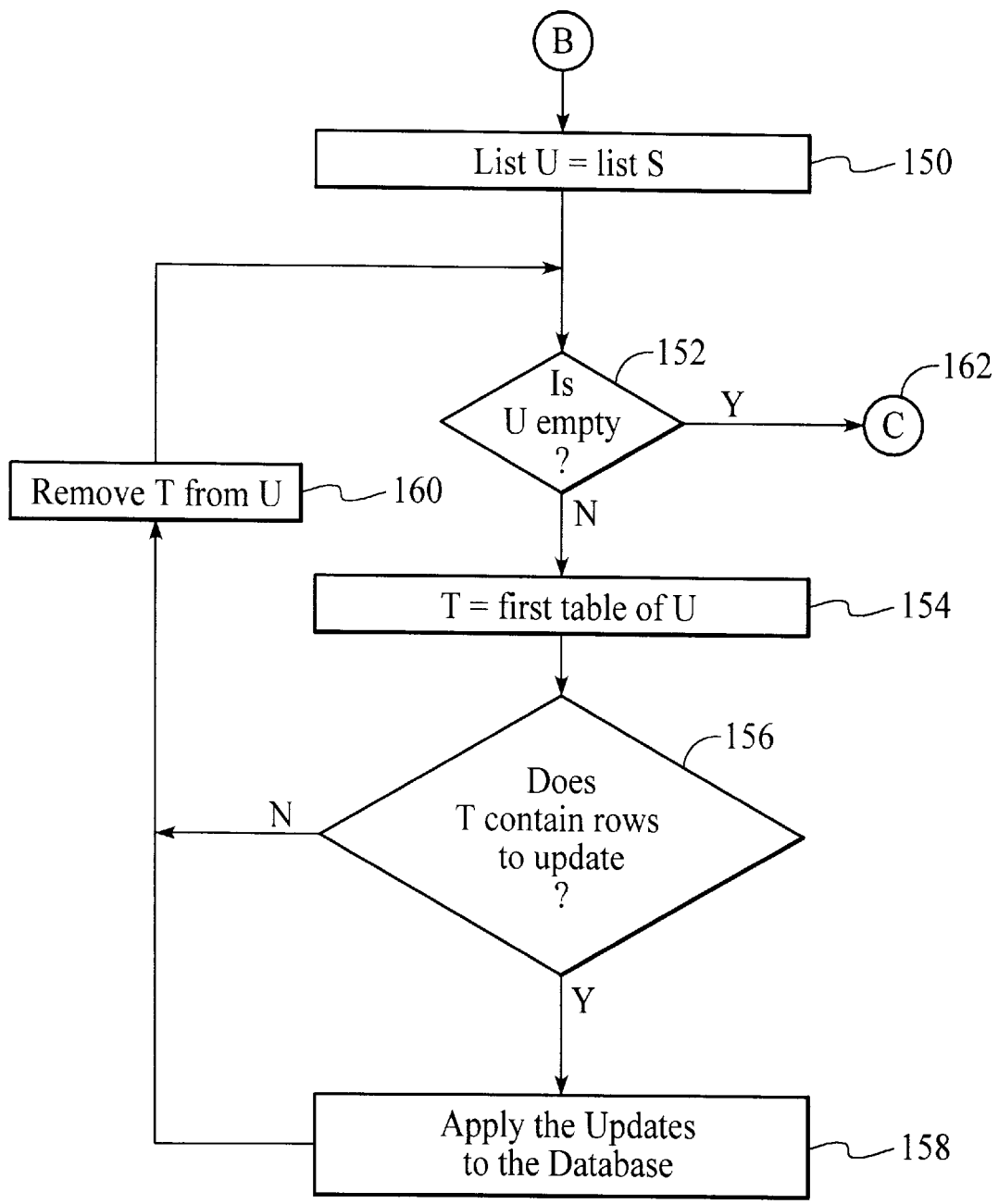

When it is determined that "X" is empty in step 132, the process continues as shown in FIG. 7, which applies the update operation to the acyclic tables.

To begin, a list "U" is set equal to list "S" in step 150. It is then determined if "U" is empty in step 152. If not, then "T" is set equal to the first table of "U" in step 154. It is then determined if "T" contains rows that need to be updated in step 156. If there are such rows in table "T", then the update operations are applied to those rows in step 158 and "T" is removed from the list "U" in step 160. If there are no rows in table "T" that need to be updated in step 156, "T" is simply removed from the list "U" in step 160. After table "T" is removed, the process resumes with step 152.

Figure 8:
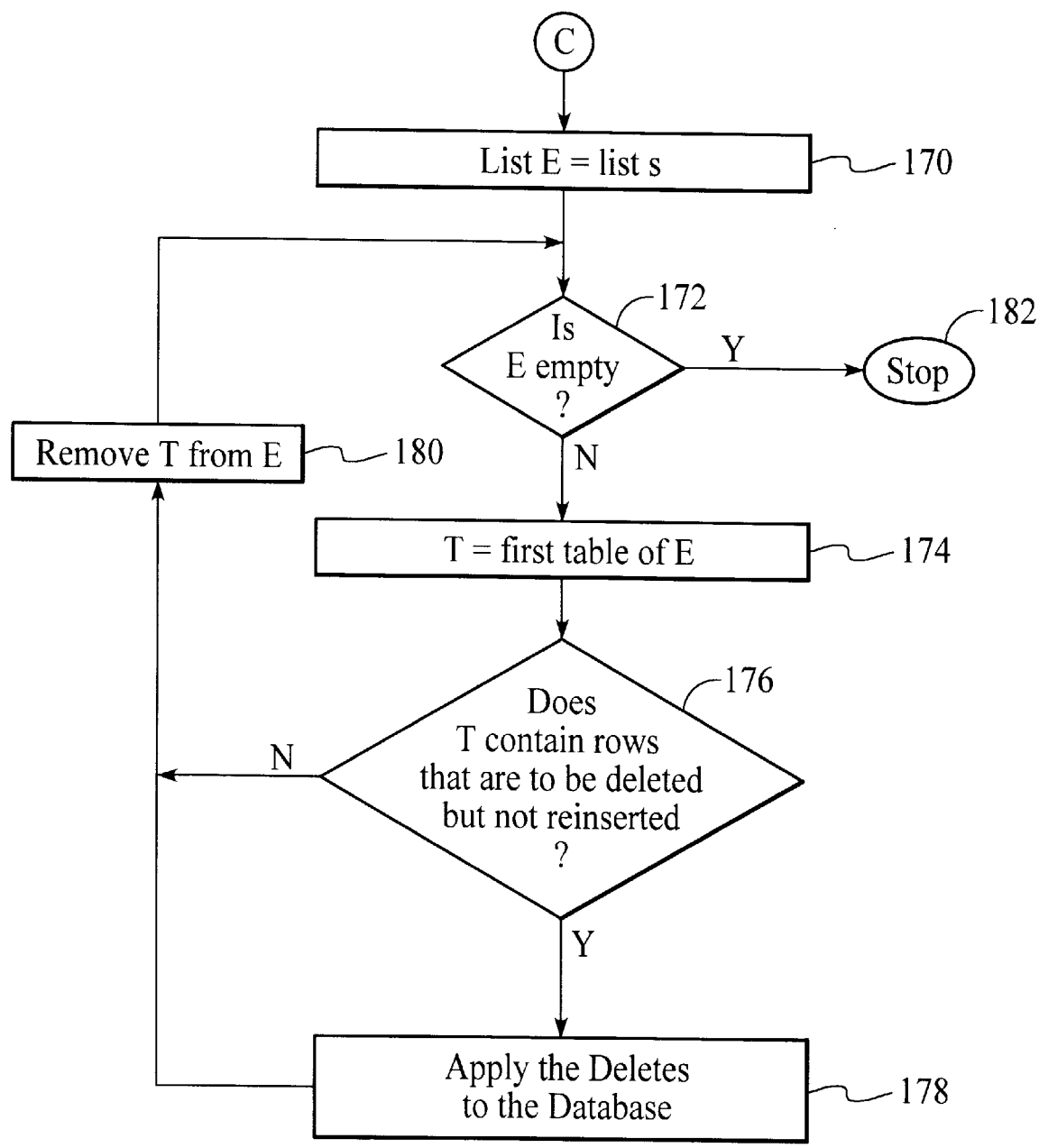

When it is determined that "U" is empty in step 152, the process continues as shown in FIG. 8, which applies the delete operation to the acyclic tables that contain rows that need to be deleted but not reinserted.

To begin, a list "E" is set equal to list "S" in step 170. It is then determined if "E" is empty in step 172. If not, then "T" is set equal to the first table of "E" in step 174. It is then determined if "T" contains rows that need to be deleted in step 176. If there are such rows in table "T", then the delete operations are applied to those rows in step 178 and "T" is removed from the list "E" in step 180. If there are no rows in table "T" that need to be deleted in step 176, "T" is simply removed from the list "E" in step 180. After table "T" is removed, the process resumes with step 172. When it is determined that "E" is empty in step 172, the entire process ends.

According to the update ordering scheme of the present invention, the tables are grouped into those with and without foreign key relationships and completely bypasses the tables without foreign key relationships. Furthermore, a different update ordering scheme is used for the acyclic tables to further increase overall processing speed of the system.

Another aspect of the present invention is the efficient handling of overlapping foreign and primary keys. As stated above, a foreign or primary key can contain multiple attributes and two keys overlap when they have one or more attributes in common. In case where a foreign key overlaps a primary key, the update of the foreign key may or may not be allowed. When an update is allowed, it invalidates any other foreign, key the current key partially but not completely overlaps with. The task is to define which foreign key updates should be allowed and which ones should be forbidden.

Referring again to FIG. 3, the cache 34 maintains the following information for each key in a row to be updated: the keys (foreign or primary) the attribute overlaps with, the keys the attribute completely contains, and the keys the attribute is completely contained by. This information determines whether to allow the foreign key update or not (it will not be allowed if it changes a primary key attribute value). It also determines what other foreign keys are invalidated by this update. In conventional systems, this information is maintained in linked lists. Unfortunately, however, creating and traversing large linked lists is memory intensive and can be slow.

According to the present invention, the above overlap information is represented and read more efficiently using bit maps, rather than linked list, thus reducing the time required to process overlapping foreign and primary key updates.

Each primary and foreign key has a bit array that describes whether there is any overlap between the attributes that make up this key and other keys in the same table, where each bit position corresponds to a particular key. For example, assume that attributes (a, b, c, d) exist in a table and that key1 comprises attributes (b, c), key2 comprises attribute (c), and key3 comprises attributes (b, d). A bit array will be associated with each key that has three bits corresponding to each of the three keys, where a 1 indicates an overlap. The bit array for key1 is (0, 1, 1) because key1 overlaps with key2 (attribute c is contained in both keys), and key1 overlaps with key3 (attribute b is contained in both keys). The bit map does not indicate which attributes overlap. For this information, more detailed metadata about the table must be examined. But the bit map does allow a fast check to see if this metadata access can be avoided, thus speeding processing. In another preferred embodiment of the present invention, a second bit array is associated with each key that indicates whether the key is fully contained by other keys. In the example above, the second bit array for key2 would be (1, 0, 0) because key2 is fully contained in key1 (c is contained in (b, c)). This additional bit map speeds processing because key containment is a common occurrence in applications and the knowledge that one key is contained in another key speeds up the checking performed during key update operations.

Although the present invention has been described in accordance with the embodiments shown, one of ordinary skill in the art will readily recognize that there could be variations to the embodiments and those variations would be within the spirit and scope of the present invention. For example, although the present invention has been disclosed in terms of a database environment having an object-oriented front-end and a relational database backend, the present invention is independent of the object model and independent of the backend database mode. Accordingly, many modifications may be made by one or ordinary skill in the art without departing from the spirit and scope of the appended claims.

What is claimed is:

1. A method for handling of database updates for overlapping keys, the database including one or more tables wherein each table includes at least one row having one or more attributes and one or more keys, the method comprising the steps of:

(a) creating a bit map for each key in each table representing overlapping key information, wherein each bit in the bit map corresponds to the keys in the child table; and (b) enforcing key update constraints by reading the bit maps, thereby reducing the time required to process overlapping key updates.

2. The method of claim 1 further including the step of grouping the tables into parent tables and child tables and creating the bit maps for the keys in the child tables.

3. The method of claim 2 further including the step of associating a second bit array with each key that indicates whether the key is fully contained by other keys.

* * * * *